United States Patent [19]

Kasahara

[11] Patent Number: 5,202,179
[45] Date of Patent: Apr. 13, 1993

[54] ELECTROSTATIC ATTRACTING SHEET

[76] Inventor: Keiji Kasahara, 1128-14 Kakegawa, Kakegawa-shi, Shizuoka, Japan

[21] Appl. No.: 507,130

[22] Filed: Apr. 10, 1990

[30] Foreign Application Priority Data

May 20, 1989 [JP] Japan .................................. 1-127392

[51] Int. Cl.$^5$ .............................................. B32B 5/16
[52] U.S. Cl. .................................. 428/323; 428/330;
428/402; 428/403; 428/411.1; 428/430;
428/913; 430/32; 430/69
[58] Field of Search ..................... 428/411.1, 430, 913,
428/403, 323, 330, 402; 430/32, 69

[56] References Cited

U.S. PATENT DOCUMENTS

| | | | |
|---|---|---|---|
| 3,634,740 | 1/1972 | Stevko | 317/262 E |
| 3,916,270 | 10/1975 | Wachter et al. | 317/262 |
| 4,751,609 | 6/1988 | Kasahara | 361/234 |
| 4,752,525 | 6/1988 | Oyachi et al. | 428/403 |
| 4,861,665 | 8/1989 | Kasahara | 428/411.1 |
| 4,864,461 | 9/1989 | Kasahara | 361/234 |
| 4,933,109 | 6/1990 | Yamada et al. | 428/403 |

FOREIGN PATENT DOCUMENTS

| | | | |
|---|---|---|---|
| 3716116 | 12/1988 | Fed. Rep. of Germany | 428/323 |
| 53-13389 | 4/1978 | Japan . | |
| 54-41892 | 12/1979 | Japan . | |
| 55-20830 | 6/1980 | Japan . | |
| 57-58872 | 12/1982 | Japan . | |
| 62-062872 | 3/1987 | Japan | 428/323 |
| 63-318568 | 12/1988 | Japan | 428/323 |
| 2169296 | 6/1986 | United Kingdom | 428/323 |

OTHER PUBLICATIONS

Abstract of Japanese Patent No. JP-A-63 180 964 to Ricoh published Jul. 26, 1988.
Abstract of Japanese Patent No. JP-A-61 244 547 to Boseki published Oct. 30, 1986.
Abstract of Japanese Patent No. JP-A-58 020 722 to Seisan published Feb. 2, 1983.
Abstract of Japanese Patent No. JP-A-61 241 336 to Nitsukan published Oct. 27, 1986.
Abstract of Japanese Patent No. JP-A-59 006 235 to Seisan published Jan. 13, 1984.

*Primary Examiner*—Bruce H. Hess
*Assistant Examiner*—Elizabeth Evans

[57] ABSTRACT

An electrostatic attracting sheet which is used in a paper sheet-attracting device of X-Y plotter or the like, the attracting sheet being made of a high polymer substance selected from a group consisting of plastics such as polyurethane, polyacetal, polyamide and polyester, and synthetic rubbers and electrically conductive coated crystal whiskers of potassium titanate dispersed in the high polymer substance. In a first embodiment, the whiskers are homogeneously dispersed in the attracting sheet at 5 to 15 wt. % of the substance, the whiskers being 0.1 to 0.3 μm in diameter, 10 to 30 μm in length and coated with tin or antimony, to produce a sheet having a thickness of 0.2 to 0.8 mm and a volume resistivity on the order of $10^{13}$ Ωcm. In a second embodiment, the whiskers are distributed in the attracting sheet, in such a state that their longitudinal axes align with a direction in which a surface of the attracting sheet extends, at 2 to 8 wt. % of the substance, the whiskers being 0.2 to 0.5 μm in diameter, 10 to 20 μm in length and coated with a white conductive substance such as tin, antimony, nickel, phosphor or aluminum to produce a sheet having a thickness of 0.2 to 0.8 mm and a volume resistivity on the order of $10^{12}$ to $10^{14}$ Ωcm.

17 Claims, 4 Drawing Sheets

ELECTROSTATIC ATTRACTING SHEET

BACKGROUND OF THE INVENTION

This invention relates to an electrostatic attracting sheet which is used in electrostatic holding apparatuses adapted to hold and transport paper sheets in the so-called X-Y plotters, copying machines or the like.

The known electrostatic holding apparatuses utilize the electrostatic coulomb force in order to attract a paper sheet or other object to be held on the holding apparatuses. Said electrostatic holding apparatuses each comprises an insulating base layer, a pair of electrodes formed thereon and an electrostatic attracting sheet laminated on and covering the base layer and electrodes. The attracting sheet is of a predetermined conductivity or of a limited electrical resistance. In said apparatuses, positive and negative electrostatic charges are imparted to the electrodes, respectively, to induce electrostatic charges in the attracting sheet.

Some examples of the known attracting devices are disclosed in the Japanese Patent Publications TOKKO-SHO-55-20830 and -57-58872.

The electrostatic attracting sheets in said known devices have a structure such that carbon black or other powder of electrically conducting materials is dispersed and embedded in a sheet of plastics or synthetic rubber. Rolling technique or extrusion method is used to form the sheets.

However, it has been difficult to disperse the conducting powder homogeneously in the plastics or rubber. The attracting sheets made by those method are disadvantageous because their conductivity is not well controlled but is likely to be influenced by ambient temperature or humidity. Thus, they cannot exert their attracting force in a stable manner.

Therefore, the inventions disclosed in the Japanese Patent Publications are directed to an improvement to diminish such disadvantages in the known art, the improvement residing in the adding of a stabilizing agent, a plasticizer, anti-aging agent, a lubricant and/or other special additives. Such additives added to the electrically conducting material are intended to eliminate the bad influences of ambient temperature or humidity in order to stabilize the attracting force.

In spite of such an intention, a well stabilized attracting force of a desirable level has not been achieved up to now. Besides, such special additives have caused a considerable rise in manufacturing cost.

SUMMARY OF THE INVENTION

Accordingly, an object of the invention is to provide an electrostatic sheet which has a well controlled electric conductivity and a stable attracting force free from detrimental influences of ambient temperature and humidity, and which can be manufactured at a lower cost.

This object is accomplished in the invention by dispersing crystal whiskers in a high polymer substance such as plastics or synthetic rubber, and by forming electrostatic attracting sheets from the high polymer substance, the crystal whiskers (hereinafter referred to as "whiskers") being electrically conductive, in such a state that, in one embodiment, the whiskers are distributed in the attracting sheet with their longitudinal axis aligning with a direction in which a surface of the attracting sheet extends.

It was observed that, in such embodiment, the distribution enhanced sufficient electrostatic charges in a direction of thickness of said attracting sheet, while electric conductivity along a surface thereof was made high enough to protect the operator's hands from electric shock.

It also was observed that a three-dimensional network structure of the whiskers was formed in the high polymer substance so that a comparatively small amount of the whiskers afforded a well-controlled conductivity to the high polymer sheets. Content of the whiskers in said substance thus can be reduced to almost half of that which is usual with carbon black used in prior art, without lowering the level of conductivity. Bending strength of the electrostatic attracting sheets provided in the invention also is improved due to the reinforcing effect of whiskers.

Further, characteristics of said sheets in the invention is scarcely affected by ambient humidity conditions. Said sheets are more resistant to higher temperatures so that electrodes which constitute an attracting device may be printed, if necessary, on one surface of the sheet within a wider range of temperatures.

In addition, white conductive substances such as some compounds of tin or antimony may be coated on the surface of whiskers, thereby producing white attracting sheets. Such white sheets may be colored with any desirable colors which will give an aesthetic value to said sheets.

BRIEF DESCRIPTION OF THE DRAWING

The invention will be described in more detail referring to the drawings, in which.

DESCRIPTION OF THE PREFERRED EMBODIMENT

First Embodiment

Figure 1:
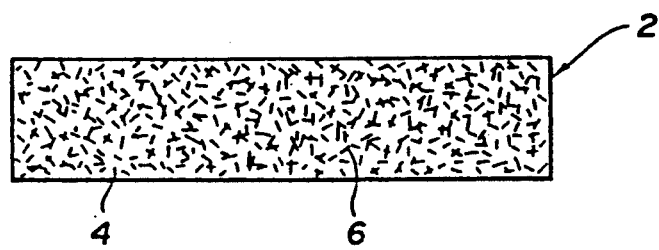
FIG. 1 illustrates in an enlarged scale an electrostatic attracting sheet which is provided in a first embodiment.
Figure 2:
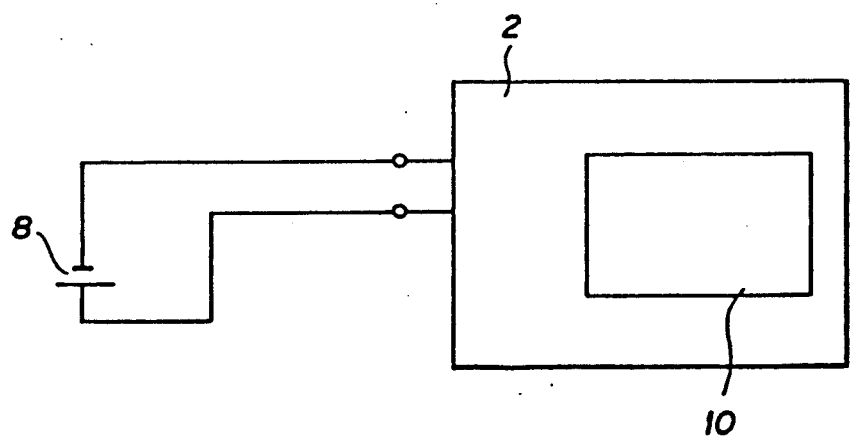
FIG. 2 schematically shows an outline of an attracting device which employs the electrostatic attracting sheet shown in FIG. 1.

FIG. 1 shows an electrostatic attracting sheet 2 made of a high polymer substance 4 and conductive crystal whiskers 6 dispersed therein. As shown in FIG. 2, a direct current is fed to electrodes attached to the back surface of the attracting sheet 2 by means of a power source 8. Consequently, electrostatic charges are induced in said sheet 2 to thereby attract an object sheet 10 thereto. The electrostatic attracting sheet 2 which contains the whiskers 6 dispersed in the polymer 4 is formed to be 0.2 to 0.8 mm in thickness.

The whiskers 6 are caused in general to scatter homogeneously throughout the polymer 4 so that uniform conductivity is imparted thereto. However, concentration or content of said whiskers in respective areas or zones of one sheet 2 may be made different, if occasions demand. In other words, the attracting force of a portion of any desirable pattern on the sheet 2 may be higher than the other portions.

Examples of the high polymer substance are: polyurethane, acrylic resins, polyamide, polyacetal, polyvinylidene fluoride, polybutylene terephthalate and the likes. They may be crystalline or non-crystalline.

Potassium titanate is one of such compounds that can produce the whiskers 6 as used in the embodiment. Diameter thereof may be about 0.1 to 0.3 μm with length of about 10 to 30 μm. The so-called reduction method or CVD (Chemical Vapor Deposition) method are effective to cover the surfaces of said whiskers with an electrically conductive substance such as tin or antimony.

Table 1 shows a result of experiments which were performed on some electrostatic sheets made of polyacetal as the polymer and with potassium titanate conductive whiskers 6.

The result shown in Table 1 indicate that the added amount of the whiskers B varying within a range from 0 to 4 wt. % brings about a greater variation of the volume resistivity of sheet 2 ranging from $5.5 \times 10^{14}$ Ω to

TABLE 1

Example of Attracting Sheets

| Added amount of whiskers (wt. %) | Volume resistivity (Ω cm) | Bending modulus (kgf/cm$^2$) | Thermal deformation temp. (°C.) (18.6 kgf/cm$^2$) |
| --- | --- | --- | --- |
| 0 | $5.5 \times 10^{14}$ | 26400 | 110 |
| 2 | $4.5 \times 10^{14}$ | $2.6 \times 10^4$ | 110 |
| 3 | $3.5 \times 10^{14}$ | — | — |
| 4 | $2.0 \times 10^{14}$ | — | — |
| 5 | $6.8 \times 10^{13}$ | $2.7 \times 10^4$ | — |
| 10 | $5.1 \times 10^{13}$ | $2.9 \times 10^4$ | 120 |
| 15 | $4.5 \times 10^{13}$ | $3.2 \times 10^4$ | 120 |
| Test method (ASTM) | D-257 | D-790 | D-648 |

$2.0 \times 10^{14}$ Ωcm. On the contrary, the added amount of whiskers varying within another range from 5 to 15 wt. % does not cause such a sharp change in the resistivity but rather stabilized resistivity within a smaller range from $6.8 \times 10^{13}$ to $4.5 \times 10^{13}$ Ωcm.

The value of volume resistivity in the order of $10^{13}$ Ωcm is the most preferable to provide the electrostatic attracting sheet having a sufficient attracting force.

The result of the above described experiments in the first embodiment suggests a better and more uniform dispersion of the whiskers compared with the case of carbon black which is of a poor dispersibility in the high polymer. A three-dimensional network in which the whiskers entangle with each other as shown in FIG. 1 is formed by the dispersed whiskers 6 in the embodiment, throughout the sheet 2. Such a network cannot be built with a conductive powder such as carbon black as used in prior art, because such conductive powder tends to aggregate. This difference in dispersion makes it possible to reduce the amount of whiskers to half of the added amount of carbon back.

Fine spherical particles of carbon black will form bead chains of a kind which is called "structure". It is assumed that electrons flows through the chains or repeatedly jump from the aggregate particles of carbon black to the surrounding high polymer phases. This mechanism of electron current makes it difficult to obtain an attracting sheet comprising carbon black which is uniform in its volume resistivity over its entire surface.

However in the embodiment, the high polymer 4 containing the whiskers 6 uniformly dispersed therein can be easily formed into the sheet 2 by the method of injection molding extrusion or other suitable methods. A desirable level of conductivity is realized in a stable and well-controlled manner in such formation of sheets.

It is also to be noted that the crystal whiskers have been used as reinforcing agent for plastics. In this connection, Table 1 is referred to again to recognize a fact that a content of or higher than 5 wt. % of the whiskers improves the bending modulus and other mechanical properties of the sheet. In particular, the thermal deformation temperature rises by about 10 centigrades whereby printing of electrodes to the sheet may be carried out, if necessary, at higher temperatures for more electrically conductive printing inks.

Second Embodiment

Figure 3:
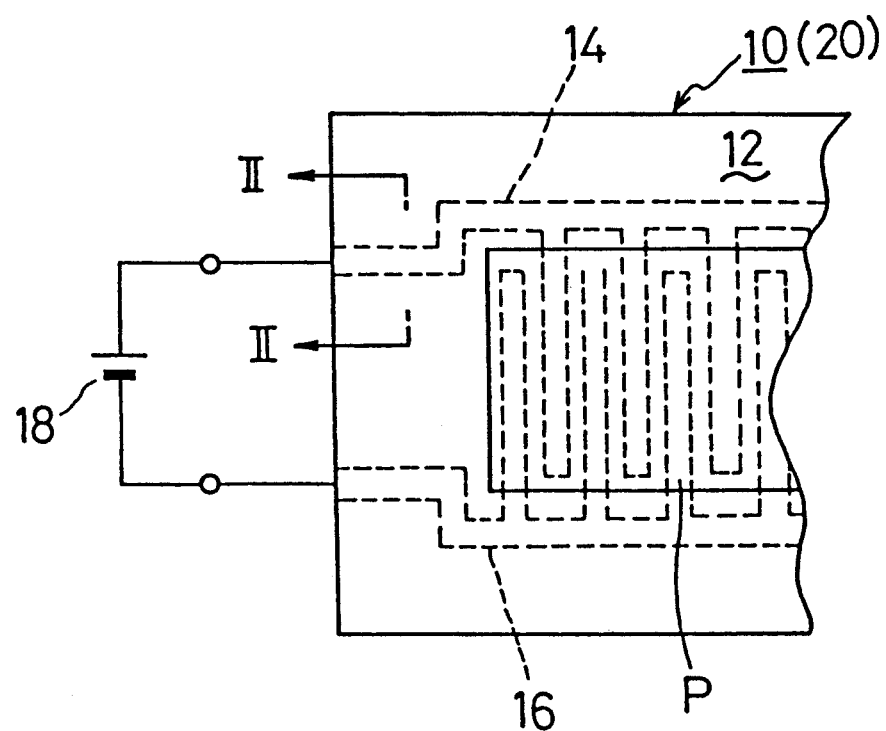
FIG. 3 shows an electrostatic attracting sheet in a second embodiment.
Figure 4:
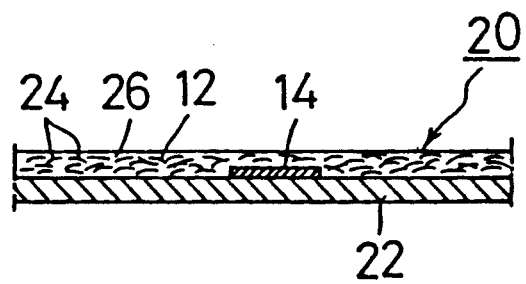
FIG. 4 is a cross section taken along a line II—II in FIG. 3.

In a second embodiment shown in FIGS. 3 and 4, an electrostatic attracting device 10 comprises a plate 20 comprising an electrostatic attracting sheet 12. A positive electrode 14 and a negative electrode 16 are of a comb-like shape and electrically connected to a power source 18. The electrodes are formed on a back surface of said attracting sheet 12. A drawing sheet of paper "P" is attracted to an upper surface of the sheet 12.

As is shown in FIG. 4, the plate 20 comprises an insulating base 22 on which the electrodes 14 and 16 are formed. Each of the comb-teeth portions of one electrode is disposed between and spaced apart from every two comb-teeth portions of the other electrode.

Bonded to the surfaces of the electrodes and a free surface of the base 22 is the electrostatic attracting sheet 12. In other words, said sheet 12 covers the electrodes and the base.

The electrostatic attracting sheet 12 which is formed by the melt-extrusion method is about 0.3 mm in thickness and has a fine internal structure as shown in FIG. 4. Dispersed in a matrix of an insulating polyacetal resin 26 are crystal whiskers 24 made of potassium titanate and coated with white conductive substance.

Figure 5:
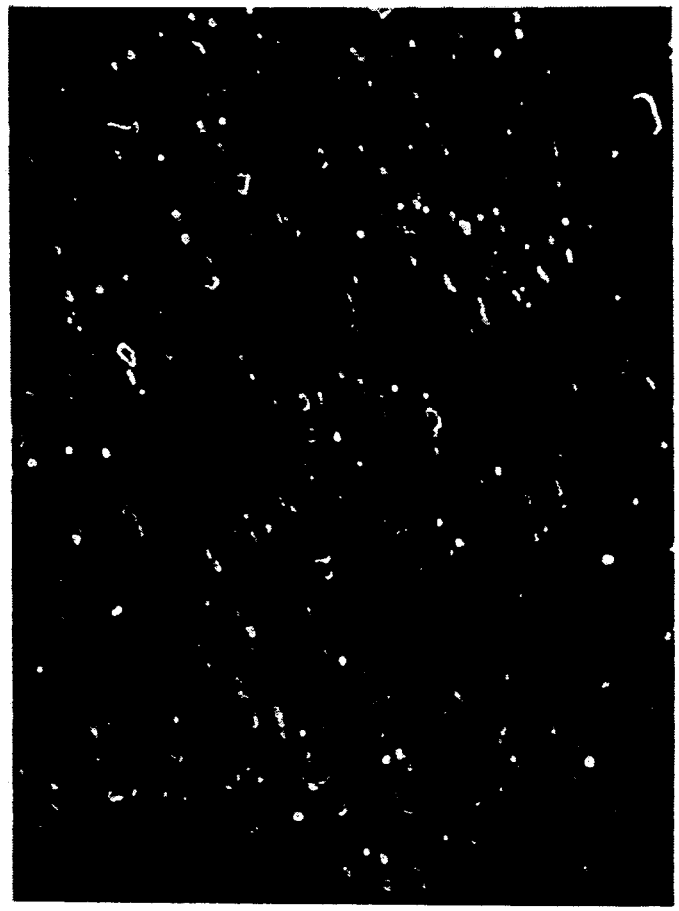
FIG. 5 is a photograph of an attracting sheet in the second embodiment, taken in an electronic microscope.
Figure 6:
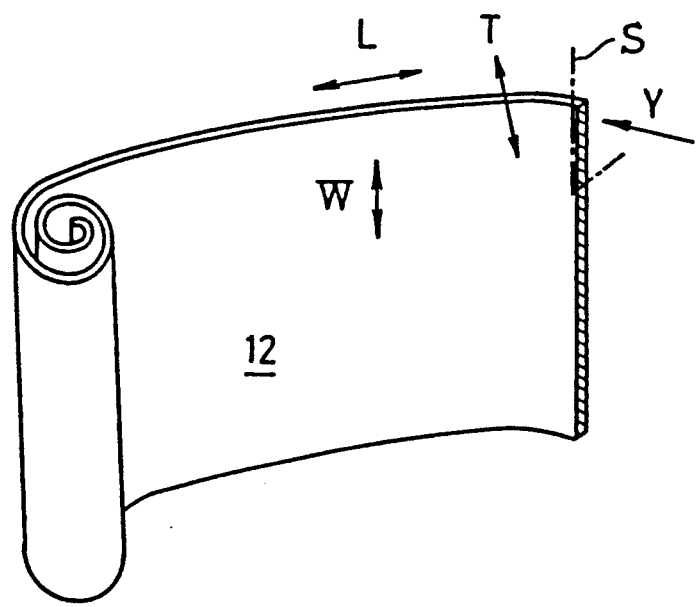
FIG. 6 is a perspective view of the attracting sheet shown in FIG. 5.

Longitudinal axes of said whiskers are almost in parallel with the surface of said attracting sheet 12. An electronic microscope of a scanning type was used to observe more finely the a state of distribution of the whiskers 24. A photograph (shown in FIG. 5) at magnification of 3,000 was taken in the microscope with a specimen which was cut from the sheet 12 along a phantom line "S" in FIG. 6. Inspection and photographing were done in a direction shown by an arrow "Y".

As will be seen from the photograph, circular and rectangular bright dots which are about 1.5 mm in diameter are cross sections of the whiskers 24. It is apparent that said whiskers are arranged in the matrix with their longitudinal axes in substantially parallel with a longitudinal direction "L" of the sheet 12. There is no significant alignment of said whiskers in a direction of thickness of said sheet 12. This brings about a volume resistivity lower in the longitudinal direction "L" than those in a transverse direction "W" and in the thickness direction "T".

The white and electrically conductive substance mentioned above is tin, in the second embodiment, which is coated at a ratio of about 1 part by weight to 2 parts by weight of the whiskers. The CVD (Chemical Vapor Deposition) method was utilized in the second embodiment to coat the whiskers with tin.

The thus coated whiskers are about 0.2 to 0.5 μm in diameter, and about 10 to 20 μm in length.

Table 2 shows characteristics of electrostatic attracting sheets which were prepared in the second embodiment by varying the content (%) by weight of white coated whiskers 24 in the sheets 12, within a range from 0% to 20%. The thickness of such sheets was set at about 0.3 mm.

Volume resistivity of an order from $10^{12}$ Ωcm to $10^{14}$ Ωcm was imparted to the attracting sheets with 2 (two) to 8 (eight) % by weight of the whiskers added in the sheets. A content higher than 8% by weight of whiskers is not desirable because electric conductivity sharply decreases giving poor attracting force to the sheets.

Despite the thickness of 0.3 mm which is remarkably smaller than the thickness from 0.8 to 1.0 mm of known conventional attracting sheets, the attracting sheets in the second embodiment proved to be much stronger in paper-attracting force than the known sheets.

TABLE 2

Examples of Attracting Sheets

| Added amount of whiskers (wt. %) | Volume resistivity (Ω cm) | Bending modulus (kgf/cm²) | Thermal deformation temp. (°C.) (18.6 kgf/cm²) |
|---|---|---|---|
| 0 | $5.5 \times 10^{14}$ | $2.7 \times 10^4$ | 110 |
| 2 | $4.1 \times 10^{14}$ | $2.6 \times 10^4$ | 110 |
| 3 | $2.5 \times 10^{14}$ | — | — |
| 4 | $1.3 \times 10^{14}$ | — | — |
| 5 | $2.8 \times 10^{14}$ | $2.9 \times 10^4$ | — |
| 8 | $8.2 \times 10^{12}$ | $3.1 \times 10^4$ | 120 |
| 15 | $6.7 \times 10^{11}$ | $3.3 \times 10^4$ | 120 |
| 20 | $4.8 \times 10^{10}$ | — | — |
| Test method (ASTM) | D-257 | D-790 | D-648 |

It is possible to employ whiskers which are coated with white conductive substances such as, antimony, nickel, phosphor, or aluminum, in place of tin. Such coated whiskers make white the attracting sheet so that any desirable color can be given to it. Colored attracting sheets made in this way will be of a higher aesthetic value and of a practical value in use compared with the known conventional black sheets which have been very black arising from the carbon black contained therein. With white or light-colored attracting sheets, fine lines which are being drawn on a paper sheet attracted on the attracting sheet in X-Y plotter can be seen clearly by an operator thereof.

It has been observed in the second embodiment that the coated whiskers imparted to the sheet a higher attracting force with the same volume resistivity as that in the known sheet produced with carbon black. I, the inventor, suppose this effect may be caused by a higher specific inductive capacity of the sheet in the invention. Relaxation time for the sheet in the invention also was observed to be longer than that for the known sheets. This may have a relationship to the higher attracting force, but requires the charged voltage to be reversed when attraction of a paper paper is to be released. It also was observed that the thickness of attracting sheet could be made smaller in the invention which probably resulted from the use of whiskers and which in turn caused the whiskers to be arranged in parallel with the surface of attracting sheet.

What is claimed is:

1. An electrostatic attracting sheet comprising a high polymer substance and electrically conductive crystal whiskers dispersed in said high polymer substance in sheet form, wherein said electrostatic attracting sheet is capable of forming an electrostatic charge therein to attract a desired object thereto.

2. The electrostatic attracting sheet according to claim 1 wherein said whiskers are distributed in such a state that the longitudinal axes thereof align with a direction in which a surface of the attracting sheet extends.

3. The electrostatic attracting sheet according to claim 2, wherein said whiskers are potassium titanate whiskers, each said whisker having a diameter of about 0.2 to 0.5 μm and a length of about 10 to 20 μm.

4. The electrostatic attracting sheet according to claim 3, wherein said whiskers are contained in said high polymer substance in a range of 2 to 8 weight percents whereby the attracting sheet has a volume resistivity of an order of $10^{12}$ Ωcm to $10^{14}$ Ωcm.

5. The electrostatic attracting sheet according to claim 4, wherein said whiskers include a coating of a white conductive substance selected from a group consisting of tin, antimony, nickel, phosphor and aluminum.

6. The electrostatic attracting sheet according to claim 1, 2, 3, 4, or 5, wherein the sheet is about 0.3 mm in thickness.

7. The electrostatic attracting sheet according to claim 4, wherein said whiskers are contained in said high polymer substance in a range of 5 to 8 weight percents.

8. The electrostatic attracting sheet according to claim 5, wherein said coating is formed by CVD (Chemical Vapor Deposition).

9. The electrostatic attracting sheet according to claim 1, wherein said whiskers are potassium titanate whiskers, each said whisker having a diameter of about 0.1 to 0.3 μm and a length of about 10 to 30 μm.

10. The electrostatic attracting sheet according to claim 9, wherein said whiskers are contained in said high polymer substance in a range of 5 to 15 weight percents whereby the attracting sheet has a volume resistivity of an order of $10^{13}$ Ωcm.

11. The electrostatic attracting sheet according to claim 10, wherein said whiskers are contained in said high polymer substance in a range of 5 to 8 weight percents.

12. The electrostatic attracting sheet according to claim 10, wherein said whiskers include a coating of a white conductive substance selected from a group consisting of tin and antimony.

13. The electrostatic attracting sheet according to claim 12, wherein said coating is formed by CVD (Chemical Vapor Deposition).

14. The electrostatic attracting sheet according to claim 1, 2, 3, 5, wherein the sheet is about 0.2 to 0.8 mm in thickness.

15. An electrostatic attracting sheet comprising a high polymer substance and electrically conductive crystal whiskers dispersed in said high polymer substance, and having a volume resistivity of an order of $10^{12}$ Ωcm to $10^{14}$ Ωcm.

16. An electrostatic attracting sheet comprising a high polymer substance and electrically conductive crystal whiskers dispersed in said high polymer substance, and having a volume resistivity of an order to $10^{13}$ Ωcm.

17. An electrostatic attracting device for attracting a desired object through the use of a Coulomb's force comprising:
 a sheet of a high polymer substance having electrically conductive crystal whiskers dispersed therein, and
 electrodes for applying an electric field to said sheet to form an electrostatic charge therein to attract the desired object.

* * * * *